United States Patent Office 3,546,469
Patented Dec. 8, 1970

3,546,469
ELECTRO-OPTICAL DISPLACEMENT MEASURER USING ZONE PLATES
Kurt Lehovec, Williamstown, Mass., assignor to Inventors and Investors, Inc., Williamstown, Mass., a corporation of Massachusetts
Filed Dec. 20, 1967, Ser. No. 692,051
Int. Cl. G01b 11/02
U.S. Cl. 250—219
18 Claims

ABSTRACT OF THE DISCLOSURE

The position of a photocell is varied along the optical axis of the light distribution generated by a zone plate optics. The variation of the position of the photocell is caused by the displacement of a surface area element thereby translating said displacement into an electrical signal. Two or more of the three components of the above-mentioned arrangement, i.e. light source, zone plate optics and photocell, can be combined into a compact integrated structure.

BACKGROUND OF THE INVENTION

Transmittance of information is a basic element of modern civilization and technology. In many cases the primary information is available in form of a sound pattern (voice) or else is recorded in form of a pattern of hills and valleys (phonograph disc). In order to communicate such information to the human ear, intermediate steps of translating the information into electrical signals are frequently required, viz the telephone conversation and the record player.

Means of translating the voice signal into an electrical signal are called microphones. My invention concerns a new and improved microphone by means of a new electro-optical read-out of the motion of minute surface elements of the microphone membrane. The surface elements can be chosen as the positions of maximum amplitude in the standing wave pattern of the membrane. Simultaneous pick-up of several selected frequencies from a single membrane is thus possible by means of several electro-optical micro transducers, placed at different positions of the membrane. The extremely small size and weight of my electro-optical micro transducer, of the order of 100 microns linear dimension and of a few micrograms, respectively, enables the design of a system containing a large number of mechanically sharply tuned pick-up heads in a small space, which simulates the function of the human ear and which might eventually be useful in such important fields as providing hearing for the deaf and the voice-activated typewriter.

Electrical read-out of phonograph discs presently utilizes a mechanical stylus for translating the hill-and-valley pattern along the grooves of the disc into electrical signals. The present invention concerns an optical stylus for an improved phonograph disc read-out, i.e. the intensity of a light beam is modulated by the pattern of hills and valleys on the disc, and is translated by a photocell into a corresponding electrical signal. An advantage of the optical read-out as compared to mechanical read-out is the absence of mechanical wear and tear and of damage by shock, which are incidental to the use of a mechanical stylus. Furthermore, optical read-out permits coating of the grooves of the phonograph record by a transparent layer of planar outer surface, thereby facilitating cleaning and avoiding the accumulation of dust in the grooves. Separate grooves for guiding the optical pick-up head along the grooves carying the sound pattern can be provided.

Mechanical displacements are translated into corresponding electrical signals also in test equipment for vibration or for surface roughness. Means to achieve this are generally known as transducers. My invention concerns an improved type of transducer by means of modulation of the intensity of a light beam in a suitable electro-optical arrangement. My electro-optical micro transducer modulates comparatively large optical energies by a mechanical displacement. Thus there is no need for large subsequent electrical amplification of the signal. Consequently, my transducer is comparatively free of electrical noise and electrical interference.

While optical means of read-out of small displacements have been known for a long time, e.g. the light beam galvanometer which translates the motion of a mirror into a moving light spot, or else the interferometric read-out of a distance between a movable plate and a fixed plate, these prior art techniques either require a large amount of space, or they are not suitable for read-out of minute areas and elevations of the order of a few microns linear dimensions, as is desirable for read-out of sound recordings. Moreover, the various parts of these known means, i.e. light source, optical system and photocell, have so for been manufactured individually, then subsequently assembled into a unit with obvious loss of compactness, requiring precision workmanship, and thus involving the possibility of error during assembly, and perhaps of misalignment subsequent to the assembly.

It is an object of this invention to provide an efficient means for translation of mechanical displacement of a small surface region into electrical signals by a compact electro-optical system.

It is another object of this invention to provide an integrated, compact, electro-optical structure for translating mechanical displacements of a small surface region into electrical signals.

It is still another object of this invention to provide a means to translate a sound pattern into a visible light pattern, indicative of the frequencies and corresponding intensities of the sound pattern.

SUMMARY OF THE INVENTION

Briefly, the invention consists of the combination into a compact electro-optical structure of (i) a coherent light source, (ii) an optical system which includes a zone plate of short focal length and which may also include a mirror or mirrors, and (iii) a photocell of small area, whereby the surface region whose displacement is to be translated into an electrical signal is rigidly attached to part of that electro-optical structure. The photocell is placed at a position in the light beam generated by the zone plate from the light of the light source, where the light intensity varies strongly with longitudinal displacement, i.e. with displacement in the direction of the axis of the light beam. A longitudinal displacement of photocell versus light beam is achieved by the aforementioned attachment of part of the electro-optical system to the displaced surface region, while the remaining part of the electro-optical system is attached to a rigid frame against which the displacement of the surface region takes place. For instance, the surface region can be used as a mirror reflecting the light beam onto the photocell, the motion of the surface region in direction to or from the photocell changing the optical path length between the photocell and the zone plate through which the light beam passes before being reflected from the surface. Or else, at least one of the elements of the assembly, light source, zone plate and photocell, can be attached rigidly to the surface, whose displacement is to be translated into an electrical signal.

The compactness of the micro read-out structure according to my invention is achieved: (1) by a choice of zone plate, since it can be made in planar form, has small lateral dimensions, and has an extremely short focal length;

and (2) by the voice of semiconducting components for the light source and the photocell, which can easily be fabricated by microcircuit technology in a size of the order of one mil linear dimension. The integrated compact structure of my invention is achieved by constructing either light source or photocell or both from semiconducting materials, which can be integrated with each other or with the zone plate by microcircuit technology.

Integration of two components A and B as used here means an inseparable combination, which is already achieved during the manufacturing process, so that component A is inseparably connected with a part of component B, before component B is completed.

DESCRIPTION OF THE PREFERRED EMBODIMENT

The invention combines a light source, zone plate means to direct and shape the light emitted from the light source into a suitable beam, a photoelectric cell placed into this light beam for converting its light energy into an electrical signal, and an arrangement to modify the light energy incident on the photocell by the displacement of the surface region, whose motion is to be translated into an electrical signal. Part of the invention consists of the electro-optical arrangement proper and another part resides in its compact, partially or fully integrated structure. First, the preferred electro-optical arrangement for a non-integrated assembly will be described, and subsequently the preferred means to integrate the electro-optical arrangement will be disclosed. Since the surface regions whose displacement we wish to translate into an electrical signal are quite small, typically between a few microns and a few hundred microns, we shall refer to them as surface elements.

Figure 1:
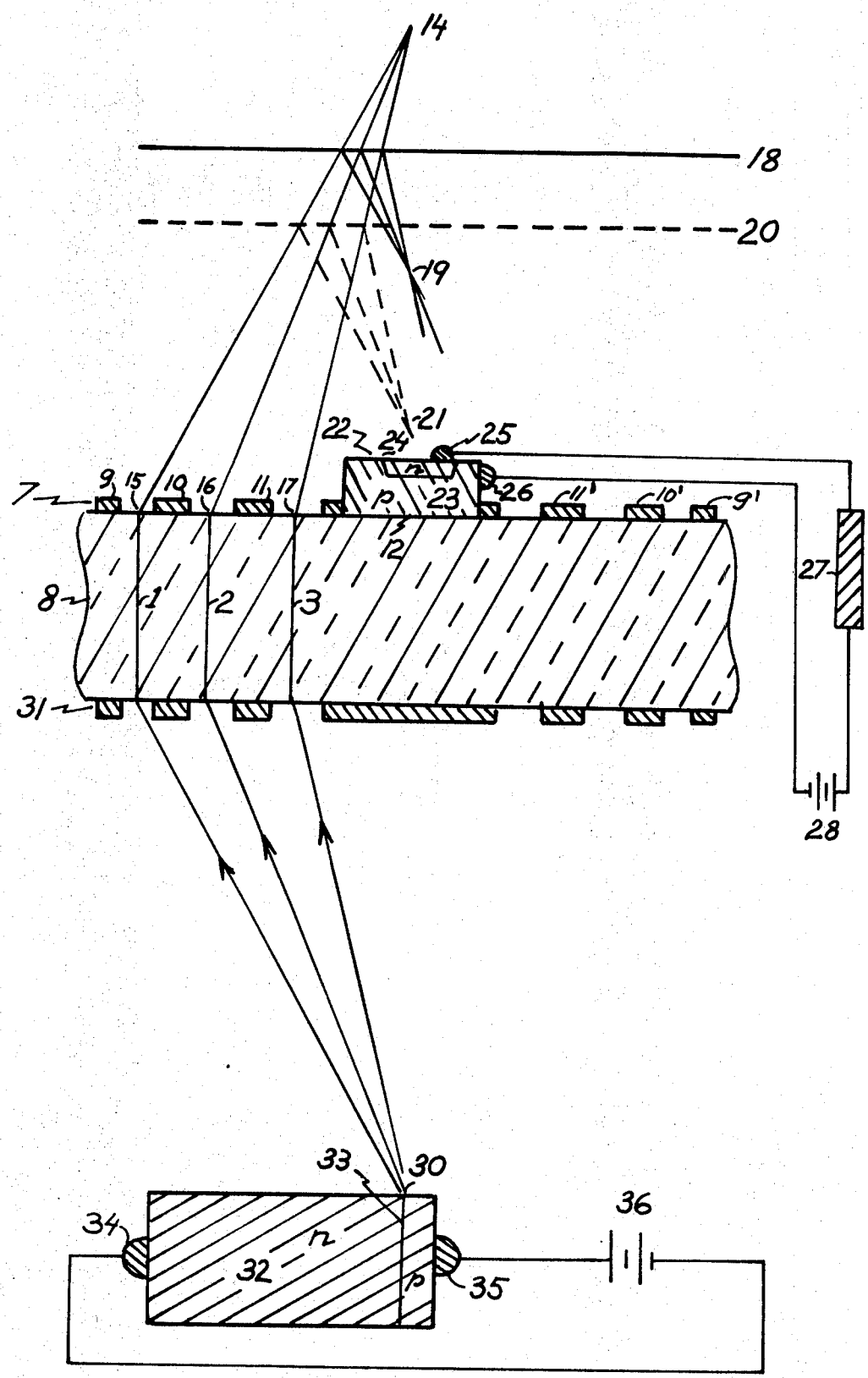
FIG. 1 illustrates in cross-section an optical arrangement according to this invention, showing the conversion of the displacement of an area element into an electrical signal in a photocell, the area element serving as a mirror in the optical arrangement.

FIG. 1 shows a cross-section along the optical axis of an electro-optical transducer according to this invention; a parallel monochromatic light beam indicated by the rays 1 through 3 is focused by a zone plate in the form of a circular zone plate 7 into the point 14. The zone plate consists of a planar substrate 8, which is transparent to the light beam and carries on one of its surfaces a series of concentric opaque rings, whose intersects with the plane of drawing are designated by 9–9′, 10–10′ and 11–11′. The center of the opaque rings is the point 12. In general, there will be more than three transparent zones between the opaque rings. However, for purpose of explaining the functioning of this preferred optical system, a sketch of only three zones suffices.

Zone plates optics has been known since many years and does not in itself represent a part of this invention. Thus, only a few comments on zone plate lenses will be made. The purpose of the opaque rings is to focus the parallel light beam containing the rays 1 through 3 into the point 14. The focusing action of the zone plate results from the phase relation at the point 14 among the wavelets emitted from the points of the transparent zones on the zone plate and involves an optical principle known as interference. To achieve interference the incident light beam has to be coherent. In order for the wavelets emitted from the points 15, 16 and 17 of the transparent zones to reinforce each other by interference, the optical path lengths 15 to 14, 16 to 14 and 17 to 14 must differ by integer multiples of a vacuum wavelength $\lambda$. The wavelets arrive then in phase at 14. Their electrical field intensities can then be added directly to obtain the total field intensity. The light intensity is in proportion to the square of the total field intensity. The light intensity at a point other than the image point 14 can be determined by adding the electric field intensities arising from the wavelets emitted from 15, 16 and 17, taking into account their phase differences, and then squaring the resulting field intensity. It is found that the light intensity decreases with increasing distance from the image point 14 (at least for not too large distances), because the individual wavelets are increasingly out of phase with each other.

Optical path length is the geometrical length multiplied by the index of refraction. The width of each transparent zone is such that the optical path length from a point at the outer boundary to 14 differs from the path length from a point at the center circle of the zone to 14 by $+\lambda/4$, and the optical path length from a point at the inner boundary to 14 differs from the optical path length from a point at the center circle to 14 by $-\lambda/4$.

The surface 18 whose displacement is to be recorded electrically, is placed between zone plate 7 and the focal point 14 and extends perpendicularly to the axis of the optical system. The light beam converging onto 14 is reflected from the surface 18 into the point 19, which is at the image position of 14 with respect to 18. When the plane 18 is displaced downwards into the position 20 indicated by a dotted line, the image of the focal point moves downwards by twice this amount to the position 21. A photocell 22, fixed in position with respect to the zone plate, thus receives a larger amount of light when the reflecting surface is at position 20 and the focal point is at 21, than when the reflecting surface is at position 18 and the focal point is at 19. Conversely, if the reflecting surface would move a small distance upwards, i.e. farther away from the zone plate 7, the light intensity at the photocell 22 would decrease. However, in the case of such a large downward movement, that the focal point has passed through the photocell still closer to the zone plate, the light intensity incident on the photocell diminishes again. It is obvious from these considerations, that the maximum amplitude of the displacement must be taken into account in choosing the off-set between focal point 19 in case of undisplaced surface 18 and the location of the photocell 22. In general, in the arrangement of FIG. 1, the distance between 22 and 18 must be larger than twice the maximum displacement. The modulation of the photocell current for a given displacement of the reflecting surface is increased with the aperture angle of the optical system and with decreasing light-sensitive area of the photocell. While the photocell in FIG. 1 has been placed below the focal point 19, i.e. into the divergent beam, there is a position above the focal point 19, i.e. in the convergent beam which could also be utilized.

The photoelectric cell 22 shown in FIG. 1 consists of a semi-conducting material 23, having p- and n-regions separated by a p-n junction 24. The semiconducting material 23 has a sufficiently narrow forbidden energy band gap that the incident radiation 1 to 3 is able to generate electron-hole pairs when absorbed by the material 23. Contacts 25 and 26 connect the photoelectric cell 22 electrically to a load resistor 27 and a power supply 28. The structure of FIG. 1 translates the mechanical displacement of the surface region 18 into an electrical signal in the load resistor 27. The p-n junction structure can be used also as a photovoltaic cell, i.e. generating electric power without need for an external power source 28.

In the lower part of FIG. 1, a semiconducting light source 30 and an optical system 31 to shape light emitted from 30 into the monochromatic parallel rays 1 to 3 are shown. The light source 30 consists of a wafer of single-crystal semiconducting material 32, having n- and p-regions separated by the p-n junction 33. A voltage from a power supply 36 is applied through the electrical contacts 35 and 34, causing the current to flow in the forward direction through the junction 33, thereby generating light emission by recombination of electrons and holes.

The optical system 31 consists of a zone plate quite similar to 7, the light source 30 being located in its focal point. 7 and 31 must be designed for the same wavelength. If the light source emits radiation of a range of wavelength, the zone plates act as a kind of interference filter to filter out a monochromatic beam. Separate zone plates 7 and 31 have been shown in FIG. 1 for sake of clarity only. A single zone plate can be designed to directly produce an image of the light source 30 at the point 14, without the need of a second zone plate to produce first a parallel light beam.

Figure 2:
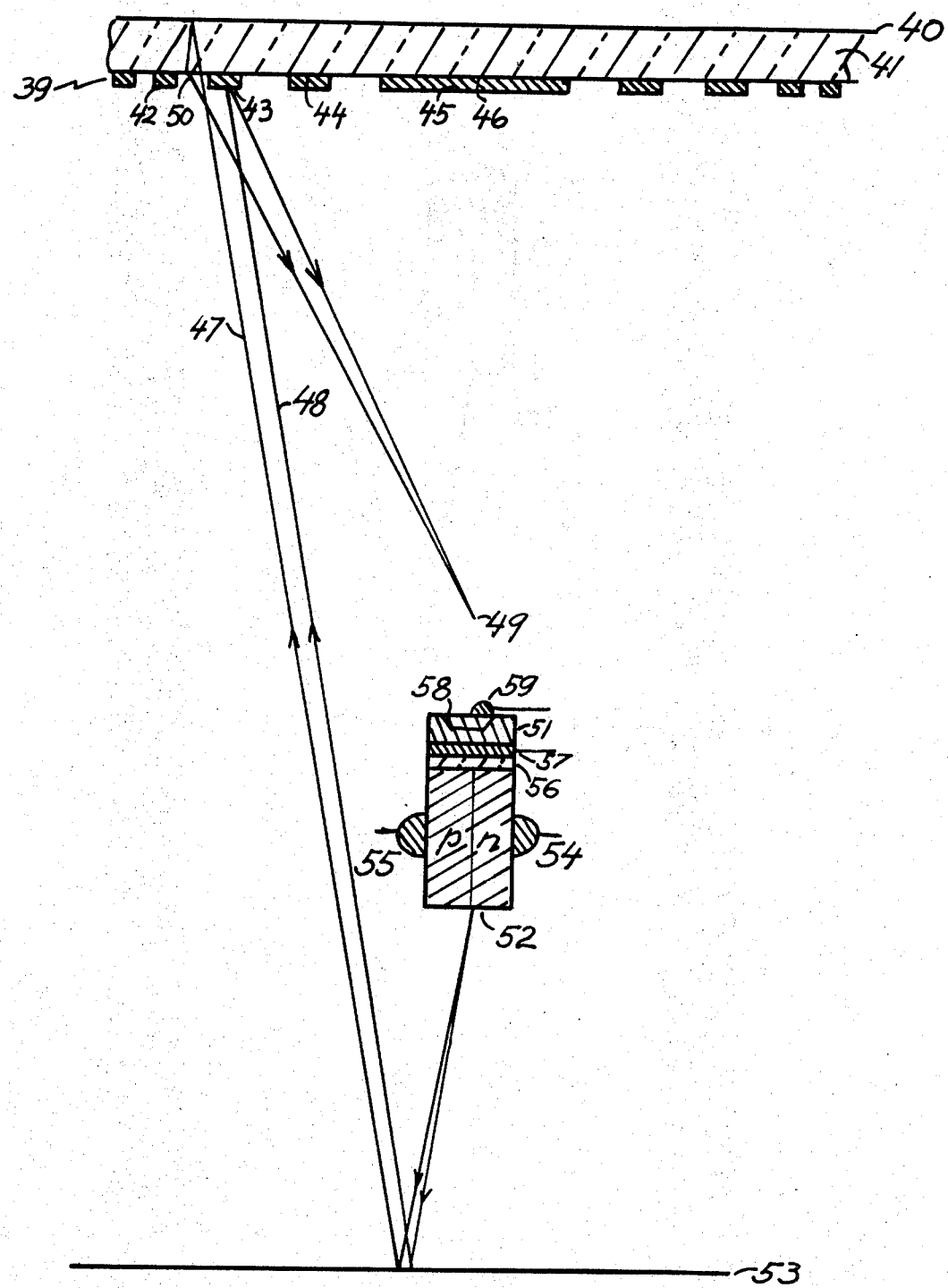
FIG. 2 illustrates in cross-section another optical arrangement according to this invention, whereby a zone plate is permanently attached to the area element, whose displacement is converted into an electrical signal in a photocell.

In the arrangement of FIG. 1 the displaced surface area element acts as a mirror for the radiation. In the arrangement of FIG. 2, the zone plate lens 39 is rigidly attached to and moves thus with the surface area element 40. The surface 40 is a light reflecting material, whose displacement is to be translated into an electrical signal. The surface 40 is coated by a transparent body 41 of such a thickness $d$, that light reflected from its front surface and light penetrating to its back surface reflected there, and then leaving the front surface, differ in phase by $\lambda/2$, i.e. $2dn=\lambda/2$ for the case of almost normal incidence. Here $n$ stands for the index of refraction of the body 41. The front surface of the body 41 carries the metallized regions 42, 43, 44 and 45, whose boundaries are concentric circles with 46 as center. Two rays 47 and 48 have been indicated in the drawing. These rays arrive with equal phase at the image point 49 of the light source 52, even though one comes from the transparent zone 50 and the other comes from the metallized zone 43 of the zone plate. The equality of phase is achieved by the phase shift $\lambda/2$ of the beam 47, when twice penetrating the layer 41. Thus all zones, transparent and metallized, of the zone plate contribute to the light intensity at 49, providing an increase by a factor 4 as compared to the case where only the transparent zones would contribute.

The light source 52 of FIG. 2 is a p-n junction laser emitting a highly coherent beam of radiation in a solid angle of about 10 to 15 degrees along the p-n junction plane. This beam if reflected by the mirror 53 onto the zone plate 39 and imaged by it into the point 49 in the vicinity of the photocell 51. Contacts 54 and 55 to supply electric power to the light source 52 are indicated in FIG. 2. The p-n junction is covered on its upper surface by an insulating film 56, on which the metal contact 57 of the p-n junction photocell 51 is placed. The metal contact shields the p-n junction 58 of the photocell 51 against direct illumination from the laser 52. The second contact to the photocell 51 is indicated by 59.

The photocell 51 is located below the image point 49. Downwards displacement of 40 moves the image point 49 closer to 51, while upwards displacement moves it further away, with a corresponding increase or decrease, respectively, of the light intensity at the position of the photocell 51.

The small lateral size of the zone plate, typically about 100 microns diameter, permits applying several read-out systems as shown in FIG. 2 to selected areas of a single microphone membrane. The motion of several area elements of the same membrane can thus be translated into electrical signals, each element having its own read-out arrangement of the type of FIG. 2. The read-out systems can be located at the position of maximum amplitudes of the standing wave patterns for different frequencies. Thus, some tone quality selection can be accomplished already in the microphone, in contrast to customary techniques, accomplishing such a selection in the electrical circuitry outside of the microphone.

In the case of the vibrating membrane 40 of FIG. 2, the same surface element is exposed to the light beam, and a portion of the optical system consisting of light source, zone plate and photocell, has been permanently attached to it. On the other hand, in the case of a phonograph record and in applications such as roughness testing, different area elements are exposed in sequence to the light beam, and thus none of the three elements, light source, zone plate lens and photocell, can be permanently attached to a given area element. In these cases, the surface area element is merely used as a mirror in the electro-optical system, similar to the arrangement of FIG. 1. However, since the resolution of the hill-and-valley structure of such a surface is limited by the size of the area element used as a mirror, it is desirable to concentrate the light beam onto a point lying in the reflecting surface. In general, this requires two optical systems, one for focusing the incident light beam on or very near to the surface, and the other for collecting the reflected and scattered beam onto the photocell.

Figure 3:
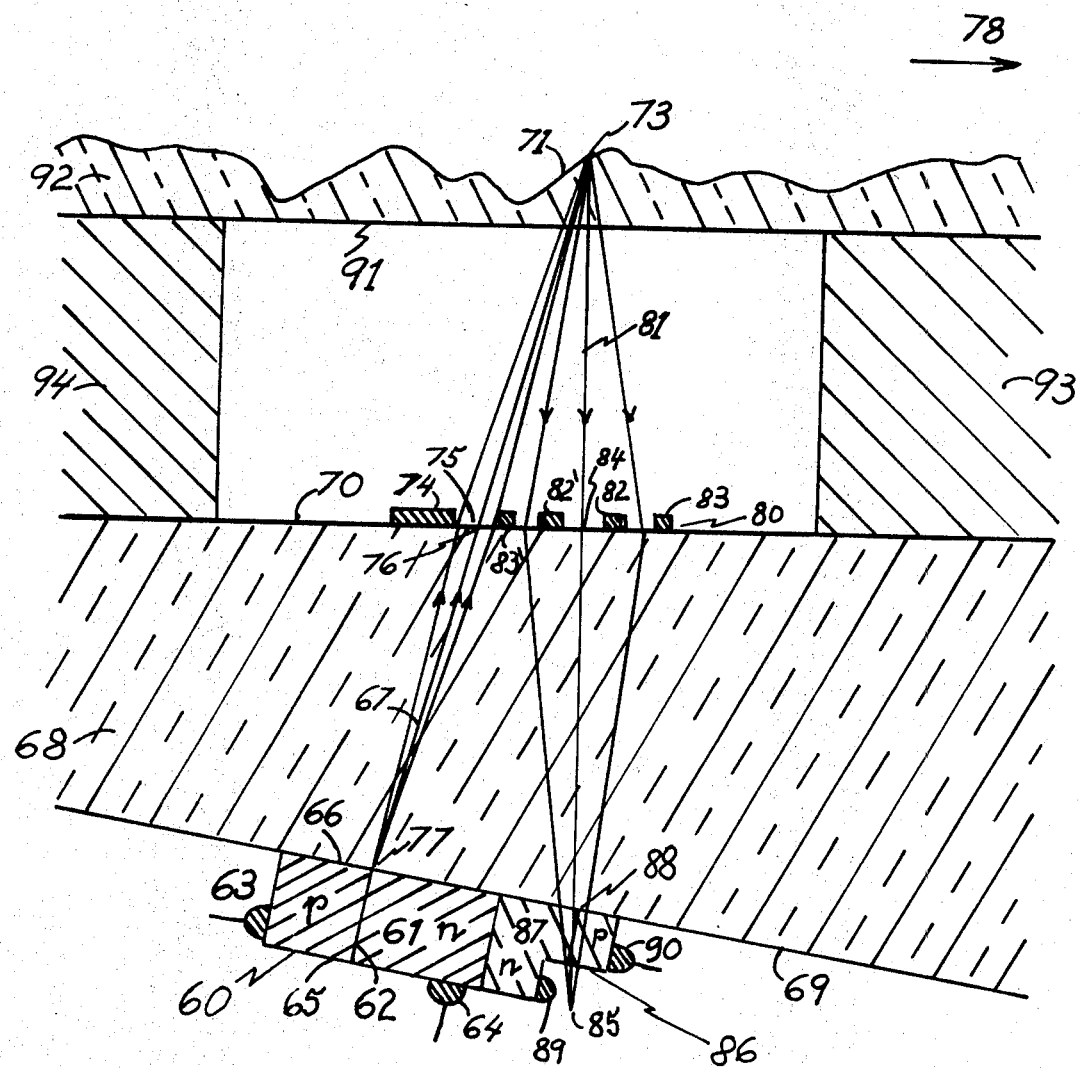
FIG. 3 illustrates in cross-section another optical arrangement according to this invention for the read-out of the displacement of extremely small area elements.

FIG. 3 shows such an arrangement in a cross-section along the optical symmetry line. The p-n junction laser 60 consists of a semiconducting material 61 having p- and n-conductivity regions separated by the p-n junction 62. Contacts 63 and 64 are provided to the p- and n-regions for applying a potential from an electric power supply to pass current in the forward direction through the p-n junction. For laser action to occur, the current must be sufficiently large and the surfaces 65 and 66 at which the p-n junction terminates must be of optical quality and parallel to each other, as can be achieved, for instance, by cleaving along parallel crystallographic planes. A suitable material for laser action is gallium arsenide, with radiation in the near infrared spectrum at about .8 micron. The laser beam 67 emitted from the junction region in a narrow cone passes through a solid material 68, transparent to the wavelength of the laser beam and having planar surfaces 69 and 70 of optical quality, ground to include a small angle, typically of a few degrees only, in order that the laser beam 67 meets the surface 71 at about the intersect with the axis 81 of the zone plate 81, i.e. at the point 73. The laser beam 76 passes through a circular opening 75 in the opaque metal layer 74 on the surface 70. This opening, whose center is at 76, is of such a diameter that the point 77 is imaged into 73. To achieve this, the opening 75 should have a radius $$a=\sqrt{\frac{\lambda LB}{nB+L}}$$

where L is the distance from 76 to 77, B is the distance from 76 to 73, and $n$ is the index of refraction of the material 68. The circular opening 75 represents a one-zone zone plate.

The horizontal arrow 78 in the upper right hand corner indicates a lateral motion of the surface 71, as caused for instance by the rotation of a phonograph record. Such a motion shifts the point 73 at which the laser beam 67 meets the surface 71 in a vertical direction on account of the slope of 71 at 73.

The upper surface 70 of the transparent solid material 68 carries a zone plate lens 80, consisting of two opaque rings, whose traces with the plane of cross-section are designated by 82–82' and 83–83', and whose center lies at 84. The optical system is designed to concentrate the cone of radiation emitted from 73 into a point 85 in the vicinity of the photocell 86, which is located adjacent to the surface 69. The photocell 86 consists of a material 87, having a p-n junction 88 and the contacts 89 and 90. If the point 73 moves downwards, the image point 85 moves even more downwards and the light intensity at the p-n junction 88 of the photocell 86 decreases.

The line 91 indicates the surface of a transparent coating 92 applied to the surface 71, which prevents accumulation of dirt in the surface 71 and establishes a plane of reference for the spaces 94 and 93, which are attached to 68 and glide over the surface 91.

Figure 4:
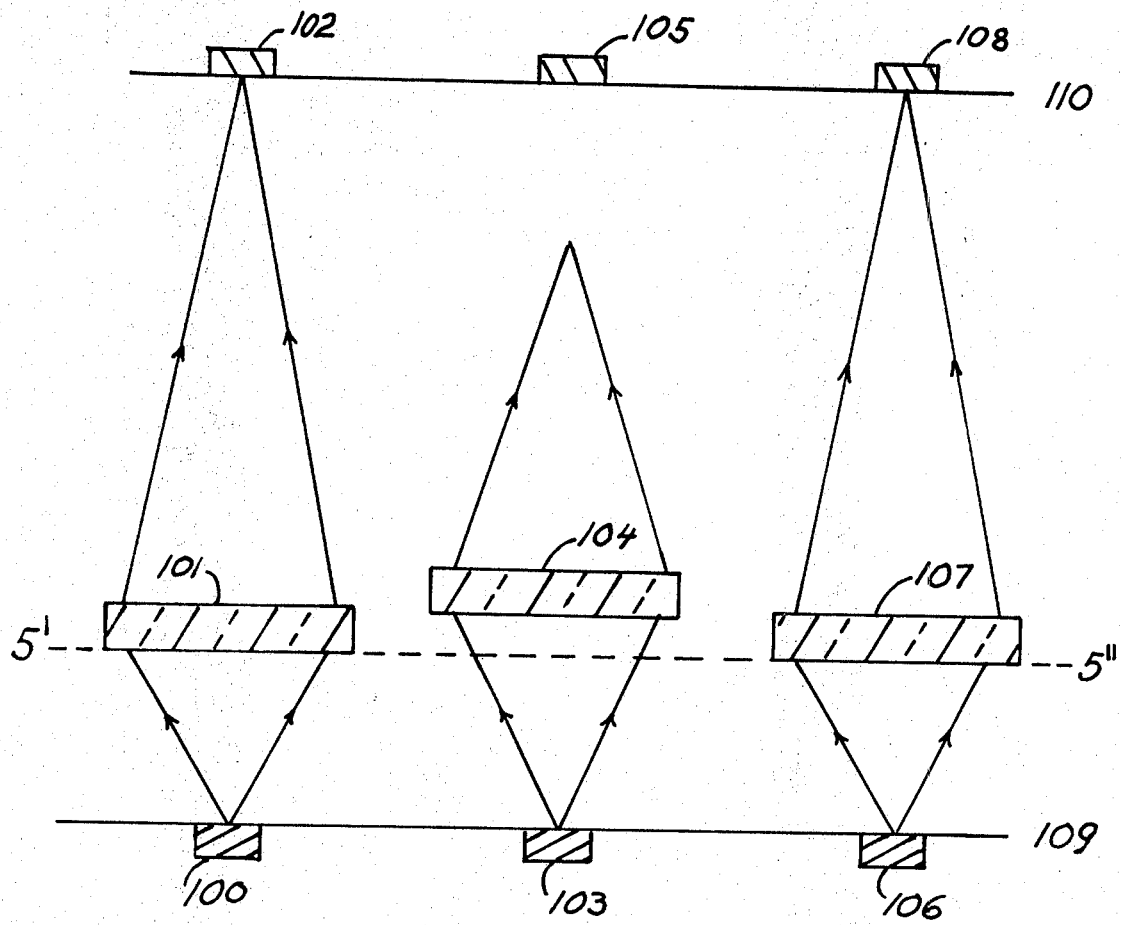
FIG. 4 illustrates a system of several electro-optical micro transducers according to this invention.

FIG. 4 shows another preferred arrangement, which locates light source 100, zone plate 101 and photocell 102 in three parallel planes along an optical axis normal to these planes. Light from the light source 100 is imaged by 101 onto the photocell 102, as indicated by the optical rays bearing arrows.

Either one of the three elements, 100, 101, 102, might be attached to a vibrating system, causing a change in the light flux on the photocell. However, vibration of the zone plate is preferred, since the zone plate does not involve electrical contacts. The arrangement of FIG. 4 is particularly useful, where a large number of micro transducers operating at different frequencies are required. Three such transducers, having the elements 100, 101, 102; 103, 104, 105; and 106, 107, 108, are shown, the light sources 100, 103 and 106 being in the plane 109, and the photocells 102, 105 and 108 being in the plane 110. The zone plate 104 is displaced relative to the plane of 101 and 107, indicated by the dotted line 5'–5", and this displacement causes a diminished light flux on the photocell 105.

Large arrays of photocells and of light sources can be made conveniently by microcircuit technology. Large arrays of zone plate lenses can be made by the same technology on a transparent substrate. By etching slots of suitable length and width, each zone plate can be positioned on a stem tuned to a particular vibrational resonance frequency.

Figure 5:
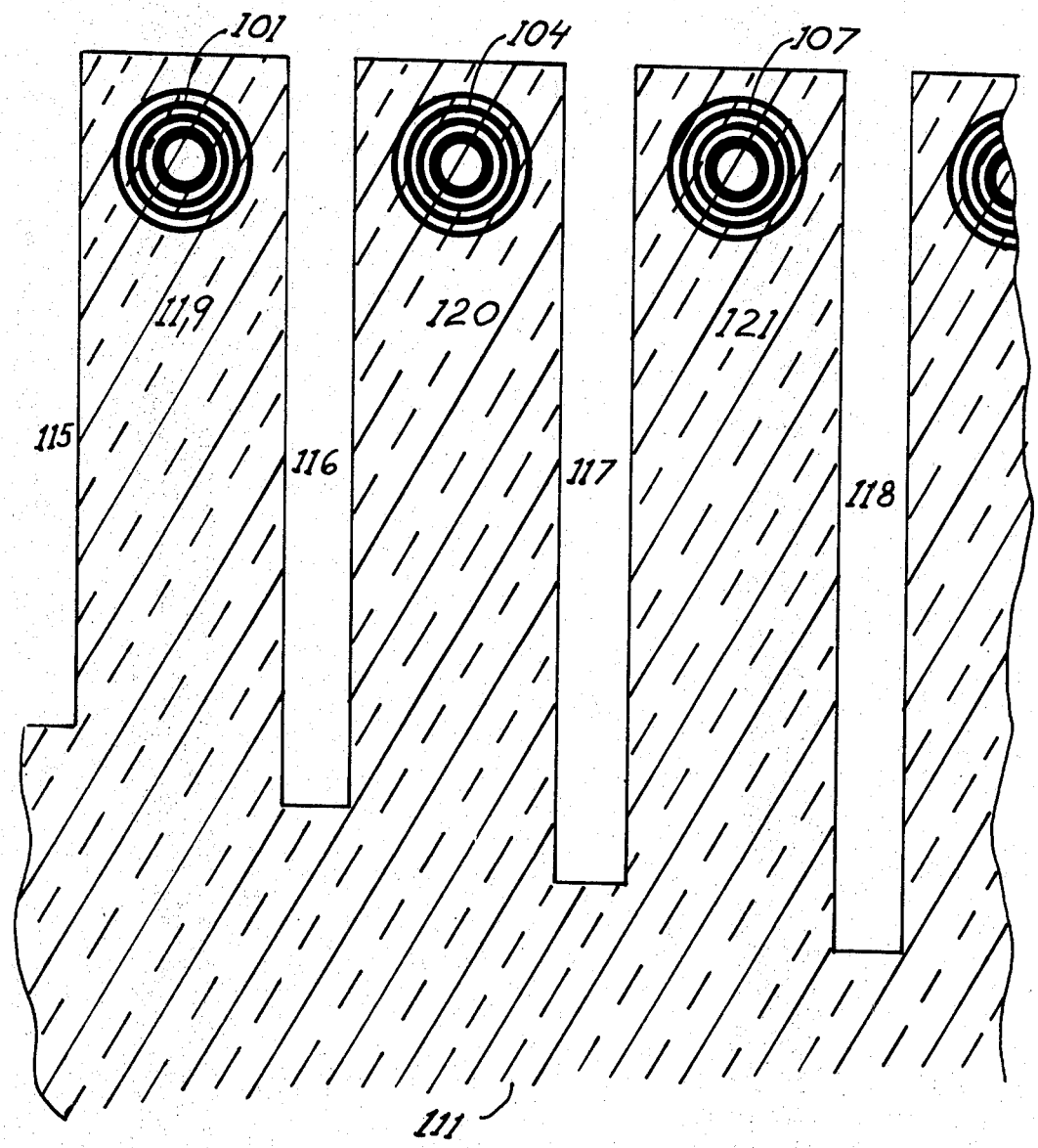
FIG. 5 illustrates a view in direction of the light beams on the zone plates of FIG. 4.

FIG. 5 shows a top view of three such zone plate stems lying in the plane 5'–5" of FIG. 4. The transparent material 111 has slots 115, 116, 117 and 118, to provide the stems 119, 120, 121, on whose upper parts are located opaque concentric rings, constituting the zone plates 101, 104 and 107. The dimensions of the stems are chosen to have the desired resonance frequency. Considering the size of a zone plate of only about 100 microns diameter, and a slot width of about 25 microns, it is seen that about 80 resonance frequencies can be accommodated side by side on a length of 1 centimeter, corresponding roughly to the number of individual frequencies available on a piano. The responses of the photocells can be used to govern the light intensity of a television screen, each position of the screen corresponding to a particular photocell and thus a vibrational frequency. In this manner, an acoustical signal can be translated into a visual one. We may even go a step further and replace the set of photocells in FIG. 4 by the human eye, thus translating the sound pattern directly into a visual pattern. For this purpose the photocell (eye) is placed exactly in the image position of the light source for the undisplaced zone plate, so that displacement in either direction causes a decrease in the light intensity at the receiver. This is necessary, if the receiver is capable of perceiving time averages only, as is the case with the human eye for most of the accoustical frequencies. However, a receiver which can follow the vibrational frequencies, will then generate an electrical signal at twice the frequency of vibrations.

Having explained the principles of the electro-optical micro transducer on hand of several preferred embodiments, we shall now provide quantitative design data for an actual zone plate optics as may be used in this invention.

Consider first a zone plate lens to focus a plane parallel monochromatic beam of normal coincidence into a point of distance $z$ from the zone plate. This is the situation of the zone plate lens 7 in FIG. 1. The condition for selecting the circles at the centers of the zones is $R_p = R_o + p\lambda$, where $p$ is an integer, $R_o$ is the distance from the center circle of the innermost zone to the focal point, and $R_p$ is the distance from the center circle of the zone of index $p$ to the focal point. Designating the radii of the circles in the centers of the zones by $r_o$ and $r_p$, respectively, one has $R_p = \sqrt{r_p^2 + z^2}$ and $R_o = \sqrt{r_o^2 + z^2}$, so that $r_p^2 = r_o^2 + 2R_o p\lambda [1 + p\lambda/2R_o]$. In most cases $R_o \gg \lambda$, that $p\lambda/2R_o$ can be safely neglected. The radii of the outer ($a_p$) and inner ($b_p$) boundaries of the $p$th zone are chosen so that $\sqrt{a_p^2 + z^2} - \sqrt{r_p^2 + z^2} = \lambda/4$, and $$\sqrt{b_p^2 + z^2} - \sqrt{r_p^2 + z^2} = -\lambda/4$$

i.e.

$$a_p - r_p = (\lambda/4)[\sqrt{a_p^2 + z^2} + \sqrt{r_p^2 + z^2}]/[a_p + r_p] \approx \lambda z/4r_p$$

and $r_p - b_p \approx \lambda z/4r_p$, where $\lambda \ll r_p \ll z$ has been assumed. As an example, assuming $z = 200$ microns, $\lambda = .8$ microns, $r_o = 20$ microns, we arrive at the following values for a five-zone lens:

| | Microns | | |
|---|---|---|---|
| $p$ | $bI$ | $aI$ | $rI$ |
| 0 | 18 | 22 | 20 |
| 1 | 25.4 | 28.5 | 27 |
| 2 | 31.3 | 33.7 | 32.5 |
| 3 | 35.9 | 38 | 37 |
| 4 | 40 | 42 | 41 |

In the case that we wish to construct a lens for imaging a point at the distance $z$ in front of a lens in a medium of index of refrection $n$ into a point a distance $z$ behind the lens in air, we have to divide each distance for the lens described in the table above by $(1+n)$. For instance, in case of the same wavelength $\lambda = .8$ microns as previously, and $n = 1.74$ (sapphire), we have to divide by 2.74 and then arrive at $z = 200/2.74 \approx 73$ microns, and $$r_o = 20/2.74 = 7.3$$

microns. In this manner the zone plate lens 80 and distances 85 to 84 and 84 to 73 in FIG. 3 can be chosen. The transparent center disc in the lens 80 in FIG. 3 has then a radius of 5.0 microns. This is also the radius of the one zone disc 75.

Next we shall describe quantitatively the change in light energy at the optical axis, as we move away from the focal point $z$ by a distance $\delta$, considering again a plane parallel beam of normal incidence on the lens. The decrease in light intensity arises primarily (small second-order effects will be ignored here) from the fact that the wavelets emitted from the various zones are increasingly out of phase. For instance, the path difference between $R_p' = \sqrt{r_p^2 + (z+\delta)^2}$ and $R_o' = \sqrt{r_o^2 + (z+\delta)^2}$ is $$R_p' - R_o' = (R_p - R_o)(R_p + R_o)/(R_p' + R_o') \approx p\lambda[1 - \delta/(z+\delta)]$$

Thus the sum of the phase factors $$\left|\sum_p \exp i(2\pi/\lambda)(R_p' - R_o')\right| = \left|\sum_p 1 + \exp[-i\, 2\pi p\delta/(z+\varrho)]\right|$$

where $i = \sqrt{-1}$. Clearly, once $2\pi p\delta/(z+\delta) = 2\pi$, i.e. $\delta = z/(p-1)$ for the zone of largest index $p$, the preferred phase angle relationship of zones between the innermost and the $p$th zone is completely lost and their contributions to light intensity vanish by interference. Thus the useful range of $\delta$ for modulations of the light intensity is $0 \leq \delta \leq z/(N-2)$, where $N = p+1$ is the number of zones, assuming that zones of all indices $p$ up to a maximum value have been used. In the case of $N = 5$ and $z = 200$ microns, $0 < \delta < 66$ microns. This suggests a displacement of about 30 microns between the position of the photocell and the focal point in case of the membrane at its average, i.e. rest position. The usable range of membrane displacement is then about ±10 microns, considering that the mirror action of the membrane 18 in FIG. 1 shifts the displacement of the focal point by ±20 microns. The analysis of the dependence of light energy for lateral displacements $y$ from the optical axis has to take into account the interference effects among rays emitted from different points of the same circle $r$. It is well-known that this leads to a Bessel function of zero order of the argument $yr2\pi/z\lambda$, which passes through zero at a value 2.4 of the argument, i.e. at $y=2.4\ z\lambda/r2\pi$.

Next we shall describe the preparation of the various components with particular emphasis on integration of the various components. Integration of light source, photocell and zone plate is possible since they can be made from compatible materials, i.e. solid materials which can be bonded to each other on account of compatible physical and chemical properties. Examples of such compatible materials are: gallium arsenide as material for light source and germanium as material for the photocell; or else, sapphire as material for the transparent body 8 in FIG. 1, which is the substrate for an epitaxial silicon film as the semiconducting material 23 of the photocell 22.

Integration of the electro-optical micro read-out system is accomplished by combining at least two of the three components, light source, zone plate and photoelectric cell, into a compact, inseparable, solid structure. Such an integration is possible by the use of compatible technologies in the production of light source, zone plate and photocell. The compatible technologies are those used for semiconductor microcircuits. Semiconductor light sources operating on the principle of p-n junction injection, and semiconducting photocells such as p-n junction photoelements, can be prepared by microcircuit technology, which includes the so-called photoresist technique. Preparation of zone plates involves deposition of well-defined metallized areas on a transparent substrate. Well-defined metallized areas, e.g. for the gate electrode configurations of silicon M-O-S transistors, are made on the transparent silicon oxide by the photoresist technique. Definition of boundaries of microcircuit electrode configurations to a precision better than 1 micron can be achieved. Thus the photoresist technique is eminently suitable for preparing zone plate lenses.

As a specific example we shall discuss the integration of the zone plate 7 in FIG. 1 with the photocell 22. We start with a plane parallel optically polished slab of sapphire 8. On the surface of this slab an epitaxial single-crystal layer of silicon 23 is deposited by a well-known high temperature vapor deposition process. The epitaxial silicon layer is processed into the p-n junction structure of the photocell 22 by standard microcircuit technology. Using the photoresist technique, the silicon layer is selectively removed from the outer regions of the sapphire and the zone plate 8 is then deposited by metallization and selective etching, using again the photoresist technique. In this manner an integrated, inseparable combination of zone plate lens and photocell is produced by using the compatible technologies of vaporization, photoresist, selective etching and epitaxial deposition.

An integrated structure of the p-n junction laser light source 60 and photocell 86 shown in FIG. 3 can be made as follows: We start with a gallium arsenide injection laser 60. We then deposit on one of its surfaces, parallel to the junction, an epitaxial germanium film 87. A single crystal germanium film can be deposited on a single crystal gallium arsenide because of a similarity in crystal lattice structure. The p-n junction 88 is produced in the germanium film by suitable impurity diffusion into selected areas, the remaining part of the surface of the film being protected against diffusion by a silicon oxide film.

A fully integrated structure, encompassing light source zone plate optics and photocell, can be made as follows: The light emitting surface of the integrated combination of gallium arsenide light source and germanium photocell just described and shown in FIG. 3, is coated with a vapor deposited silicon oxide film of a few microns thickness, and is then fused to a low melting point glass body. The outer surface of this glass body is then provided with the zone plate optical systems 75 and 80 by metal deposition and selective removal using the photoresist technique.

The numerical example for a zone plate lens given previously concerned rings of a diameter less than 100 microns. The thickness of semiconducting microcircuit components usually arises from mechanical considerations rather than electrical considerations. For mechanical support a substrate thickness of about 100 microns is sufficient. Thus electro-optical micro transducers can be made in a size of about $(100\ \text{microns})^3 = 10^{-6}\ \text{cm}.^3$. Considering an average density of about 5 g./cm.$^3$, we arrive at a weight of only 5 micrograms. Taking into account the great difficulties in assembling and aligning separate components of an optical system of such a small size, the advantage of using an integrated electro-optical system becomes obvious.

For purposes of illustration we have selected photocells and light sources of the semiconductor p-n junction type. It should be understood, however, that this invention is not limited to these particular components. For instance, microplasmas, generated in semiconductor vs. metal junctions or in M-O-S transistors by the high field avalanche process, can be used also as the light source of my invention. Photocells of the photocrystalline film type, e.g. the well-known cadmium sulphide photoconductive cells, can be used instead of p-n junction type photocells. It should also be stressed that p-n junction light sources in the sub-laser regime, are quite useful for my invention, and the high intensity, high monochromaticity and high coherence of laser beams is not necessarily required in most cases.

While zone plate lenses of radial symmetry have been shown in FIGS. 1 through 5 for purposes of illustration, linear zone plate gratings consisting of a set of parallel opaque lines of appropriate spacings and widths can be used also.

While we have dwelt in detail on the translation of vibrational energy into electric energy by means of a light beam and a photocell, it is obvious that my invention can be utilized also to translate vibrational energy into a pattern of varying optical density on a photographic film by merely replacing the stationary photocell by a photographic film moving in a direction perpendicular to the optical axis. Thus my invention is eminently suited for a movie-sound recording system.

As many apparently widely differing embodiments of my invention may be made without departing from the spirit and scope thereof, it is to be understood that my invention is not limited to the specific embodiments hereof, except as defined in the appended claims, in which; inseparable parts of a monolithic structure means a rigid, solid structure, which cannot be disassembled into its components such as light source, zone plate or photocell, without destruction of at least one of said components.

What is claimed is:

1. A device to convert a displacement of a surface area element into an electrical signal, said device comprising an electro-optical system including a light source, zone plate optics forming an image of said light source, and a photo cell responsive to light of said light source, said photocell located in the vicinity of said image and displaced from said image in direction of the principal optical ray through said image, the light sensitive area of said photocell restricted in size so that only a portion of the light passing from said light source through said zone plate impinges on said photocell, said principal optical ray directed essentially in the direction of displacement of said surface area element, attachment of part of said electro-optical system to said surface area element, and of the remaining part to a fixed reference frame, whereby the distance between said image of the light source and said photocell is changed by the displacement of said surface area element, and the light energy incident on the light sensitive area of said photocell is changed accordingly.

2. A device to convert the displacement of a surface area element into an electrical signal, said device comprising a light source, a zone plate positioned between said light source and said surface area element to illuminate said surface area element with a convergent cone of light and to form an image of said light source after reflection of said cone of light from said surface area element, a photocell responsive to the light of said light source placed at a position of the principal axis of said reflected cone of light in the vicinity of said image of said light source and receiving light directly after reflection from said surface area element, the sensitive area of said photocell restricted to a size smaller than the diameter of said reflected cone of light, whereby the amount of light received by said photocell varies in accordance with the change of distance between said image of light source and said photocell as a result of the displacement of said surface area element.

3. A device for retrieval of stored information, said device comprising an essentially planar reflecting surface carrying grooves of a depth varying along the grooves and representing said stored information, a first zone plate optics to generate a first image of a light source on a groove; a second zone plate optics to form a second image from said first image by collecting light reflected from said groove, a photocell placed at a small distance from said second image on the principal optical ray of said second zone plate optics leading through said second image and generating an electrical signal in response to light reflected from said groove, means to move said essentially planar reflecting surface in the direction along said groove relative to said first image, whereby the changing depth of said groove causes a change in the light intensity incident on said photocell and a corresponding change in the electrical signal from said photocell.

4. The device of claim 2 wherein said light source and photocell are made from semiconducting materials, the material of the light source having a wider forbidden band gap than that from which said photocell is made.

5. The device of claim 4 wherein said light source is made from a semiconducting material of the chemical composition $GaAs_xP_{1-x}$ with $x$ between zero and one, and said photocell is made from germanium or silicon.

6. The device of claim 2 wherein at least two of the three elements, light source, zone plate and photocell are inseparable parts of a monolithic structure.

7. The device of claim 6 wherein the transparent substrate of said zone plate is sapphire, and said photocell is made from an apitaxial silicon film on said sapphire.

8. The device of claim 6 wherein said light source is made from gallium arsenide and said photocell is made from an epitaxial germanium film on said gallium arsenide.

9. A device to convert a displacement of a surface area element into an electrical signal, said device including a point source for coherent monochromatic light, a first zone plate arranged to produce a first image of said point source on said surface area element, a second zone plate arranged to collect light from said first image into a strongly convergent beam, a photocell inserted into said beam at a position on the axis of said beam near the image point of said first image by said second zone plate, the sensitive area of said photocell being smaller than the diameter of the beam at said position of insertion, so that a displacement of said area element changes the flux of light from said light source impinging on said photocell, thereby causing a change in electrical signal in response to said displacement.

10. The device of claim 1 wherein said light source and photocell are made from semiconducting materials, the material of the light source having a wider forbidden band gap than that from which said photocell is made.

11. The device of claim 1 wherein said light source is made from a semiconducting material of the chemical composition $GaAs_xP_{1-x}$ with $x$ between zero and one, and said photocell is made from germanium or silicon.

12. The device of claim 1 wherein at least two of the three elements, light source, zone plate optics photocell are inseparable parts of a monolithic structure.

13. The device of claim 12 wherein the transparent substrate of said zone plate optics is sapphire and said photocell is made from an epitaxial silicon film on said sapphire.

14. The device of claim 12 wherein said light source is made from gallium arsenide and said photocell is made from an epitaxial germanium film on said gallium arsenide.

15. The device of claim 1 wherein said change of the distance between said photocell and said image of the light source is caused by attachment of said light to said surface area element.

16. The device of claim 1 wherein said change of the distance between said photocell and said image of the light source is caused by attachment of said photocell to said surface area element.

17. The device of claim 1 wherein said change of the distance between said photocell and said image of the light source is caused by attachment of said zone plate optics to said area element.

18. A set of electro-optical microtransducers, each comprising a light source, a zone plate forming an image of said light source, and a photocell placed along the optical axis near said image of said light source, each said zone plate attached to a supporting member capable of mechanical vibrations and being tuned to a specific resonance frequency in direction of the optical axis of said zone plate, acoustical energy incident on said set of zone plates, thus causing a vibration of those supporting members which are tuned to the frequencies contained in said incident acoustical energy, the vibration of these supporting members resulting in a change in the radiation energy incident on the photocells receiving radiation through the zone plates on said vibrating supporting members, thereby translating the spectrum of incident acoustical frequencies into a corresponding set of electrical signals.

References Cited
UNITED STATES PATENTS

| | | | |
|---|---|---|---|
| 2,472,380 | 6/1949 | Long | 356—4 |
| 3,122,601 | 2/1964 | Williams | 350—162 |
| 3,263,087 | 7/1966 | Goldman et al. | 356—152 |
| 2,679,474 | 5/1954 | Pajes | 350—162 |
| 3,262,122 | 7/1966 | Fleisher et al. | 350—162 |

ARCHIE R. BORCHELT, Primary Examiner

M. ABRAMSON, Assistant Examiner

U.S. Cl. X.R.

350—162